United States Patent
Clediere

(10) Patent No.: US 10,735,354 B1
(45) Date of Patent: Aug. 4, 2020

(54) PHOTO SPACE USER INTERFACE FACILITATING CONTEXTUAL DISCUSSION BETWEEN USERS OF A SOCIAL NETWORKING SYSTEM

(71) Applicant: Facebook, Inc., Menlo Park, CA (US)

(72) Inventor: Robin Maxime Clediere, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 79 days.

(21) Appl. No.: 16/175,711

(22) Filed: Oct. 30, 2018

(51) Int. Cl.
| | |
|---|---|
| *H04L 12/58* | (2006.01) |
| *G06F 3/0483* | (2013.01) |
| *G06K 9/00* | (2006.01) |
| *G06F 3/0481* | (2013.01) |

(52) U.S. Cl.
CPC ............ *H04L 51/04* (2013.01); *G06F 3/0483* (2013.01); *G06F 3/04817* (2013.01); *G06K 9/00288* (2013.01); *H04L 51/32* (2013.01)

(58) Field of Classification Search
CPC ....... H04L 51/04; H04L 51/32; G06F 3/04817; G06F 3/0483; G06K 9/00288
See application file for complete search history.

(56) References Cited

U.S. PATENT DOCUMENTS

| | | | | |
|---|---|---|---|---|
| 8,144,939 B2* | 3/2012 | Thorn | ................ | G06K 9/00221 382/115 |
| 2009/0122198 A1* | 5/2009 | Thorn | ................ | G06K 9/00221 348/715 |
| 2013/0282810 A1* | 10/2013 | Lessin | .................... | G06Q 50/01 709/204 |

* cited by examiner

*Primary Examiner* — Mohamed A. Wasel
(74) *Attorney, Agent, or Firm* — Fenwick & West LLP

(57) ABSTRACT

For a user in a social networking system, the social networking system provides photo spaces to facilitate communication between users. Icons represent other users, and the user interacts with an icon to view photos or other media items with which both the user and another user are associated (e.g., in which both users are visually present). When a user interacts with a photo or other media item, the social networking system generates a chat user interface for the user to have a private conversation with the second user with reference to the photo.

20 Claims, 7 Drawing Sheets

PHOTO SPACE USER INTERFACE FACILITATING CONTEXTUAL DISCUSSION BETWEEN USERS OF A SOCIAL NETWORKING SYSTEM

FIELD OF ART

The present invention relates generally to the field of electronic social networking systems, and more particularly, to organizing media items such as photos within a user interface facilitating communications with other users present in the photos.

BACKGROUND

Users of a social networking system may use the system to interact with each other based on content shared within the system. One topic of discussion might be a media item depicting two users together. In conventional systems a user needs to first search for and find a media item associated with a second user before starting a conversation in the context of the media item. For example, the user may be obliged to look through many photo albums to find a particular photo containing the second user before sending it to the user and starting a conversation about the photo. Thus, in many cases, users will not go to the effort to engage in these conversations, thereby missing opportunities for engaging with other users.

SUMMARY

A social networking system brings people together by providing the ability to store photos or other media items for users to view. However, in the past, it has been inconvenient for users to wade through large numbers of photos to find a specific one to use to begin a contextual conversation with other users. The social networking system described herein provides a photo space user interface that a user can access via an icon associated with a second user. The user can interact with the icon to easily see all photos with which both users were associated, such as by manual tagging, or through automatic means such as face recognition. In some embodiments, the system provides a timeline of a user's relationship with the second user. The user can select (e.g., tap on) the photos to initiate a private chat with the second user within the context of the selected photo, facilitating more conversation between users.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
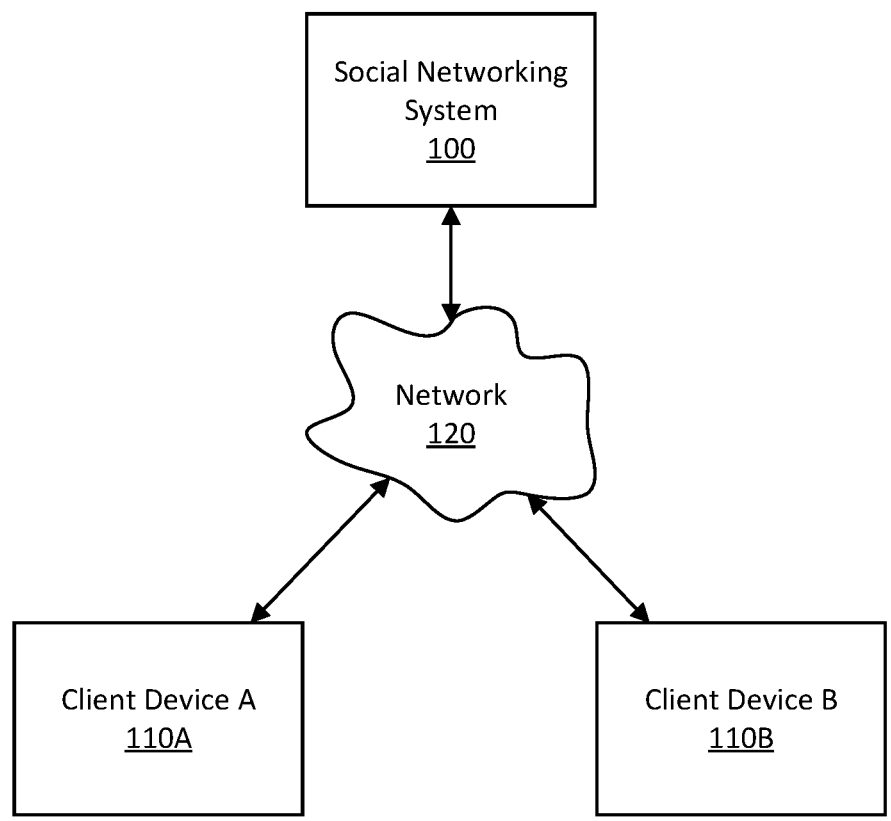
FIG. 1 illustrates a computing environment in which client devices and a social networking system operate in conjunction with a network, according to one embodiment.

FIG. 1 is a high-level block diagram of a system environment in which photo spaces are provided, according to one embodiment. The system environment comprises a social networking system 100, one or more client devices 110 used by users of the social networking system 100, and a network 120.

The social networking system 100 allows its users to generate, store, and share content, as well as to communicate with each other. In particular, the social networking system provides a graphical user interface aiding users to identify sets of photos or other media items with which the users and other users are both associated, and to initiate conversations with the other users within that context. For example, in an example embodiment described throughout the remainder of the specification, the social networking system provides a photo space graphical user interface that permits a user to browse photos in which the user has been identified with other users and to begin associated chat sessions with the other users identified in the photos.

The client devices 110 are computing devices such as smart phones, laptop computers, desktop computers, or any other device that can connect users to the social networking system 100 via the network 120. For simplicity, only two client devices are depicted in FIG. 1, although any number of client devices may be used in the computing environment.

The network 120 may be any suitable communications network for data transmission. The network 120 includes any combination of local area and/or wide area networks, using both wired and/or wireless communication systems. In an embodiment such as that illustrated in FIG. 1, the network 120 uses standard communications technologies and/or protocols and can include the Internet. In another embodiment, the entities use custom and/or dedicated data communications technologies. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 150 may be encrypted using any suitable technique or techniques.

Figure 2:
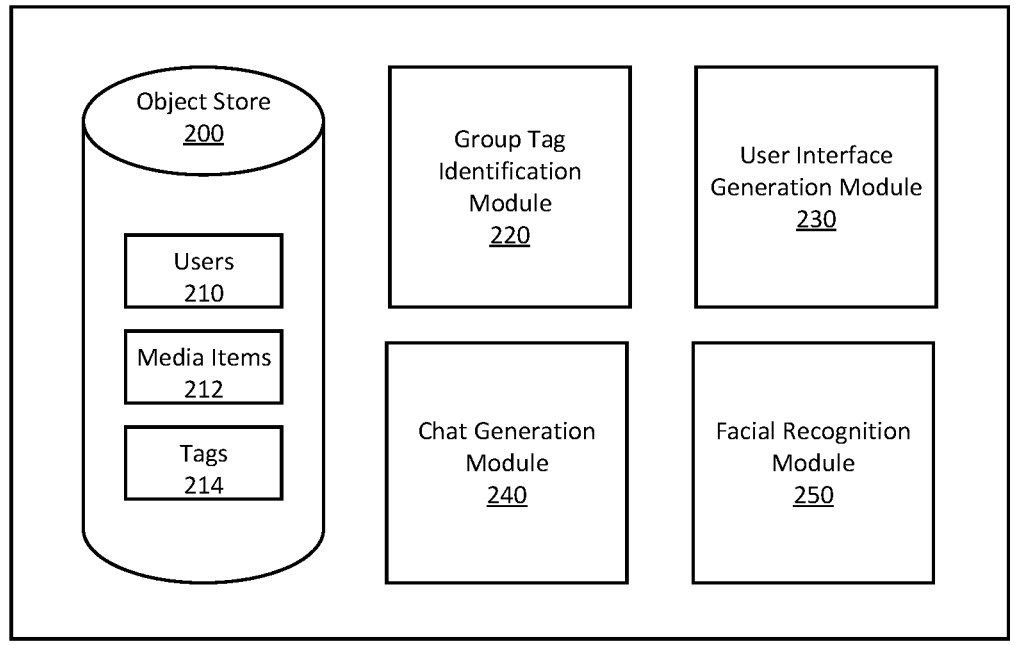
FIG. 2 is a high-level block diagram illustrating a detailed view of the social networking system, according to one embodiment.

FIG. 2 is a block diagram illustrating the system architecture of the social networking system 100. The social networking system 100 includes an object store 200, group tag identification module 220, user interface generation module 230, chat generation module 240, and facial recognition module 250. Conventional components such as network interfaces, security functions, load balancers, failover servers, management and network operations consoles, and the like are not shown so as to not obscure the details of the system architecture. In other embodiments, the social networking system 200 may include additional, fewer, or different components for various applications.

The object store 200 stores objects represented within the social networking system 100. These objects include users 210, media items 212, and tags 214, according to one embodiment, but other objects may be included in other embodiments. Users 210 include entities, such as people, businesses, and organizations that use the social networking system 100 to communicate with other users 210. Communication may be done through posts containing text and/or media items 212, according to one embodiment. Possible types of media items 212 include photos and videos. For the purposes of simplicity, throughout this application examples are given that include photos, although other types of media items 212 with which multiple users may be associated can be employed in different embodiments. Media items 212 may include photos, videos, messages, and voice recordings, among other media items. Each media item 212 may be stored in association with one or more tags 214, which indicate that a user is associated with the media item. For example, a particular photo might have two tags 214, corresponding to two different users of the social networking system 100 that are visually present in the photo. In different embodiments, tags 214 are explicitly specified by users 210 confirming the presence of other users 210 or of themselves in a photo or are implicitly specified as a result of machine learning techniques such as facial recognition, as performed by the facial recognition module 250.

The group tag identification module 220 identifies groups of users that are all present in particular photos. The group tag identification module 220 accesses the media items 212 in the object store 200, analyzes the photos to determine the presence of different groupings of users in photos using tags 214, and stores the groupings in association with the photos. For example, if users Kim, Ari, and Marissa are all present in ten particular photos on the social networking system 100, the group tag identification module 220 will identify those ten photos and store the photos in relation to the user grouping of Kim, Ari, and Marissa. This process can be done for groupings of any size with two or more users.

Figure 3:
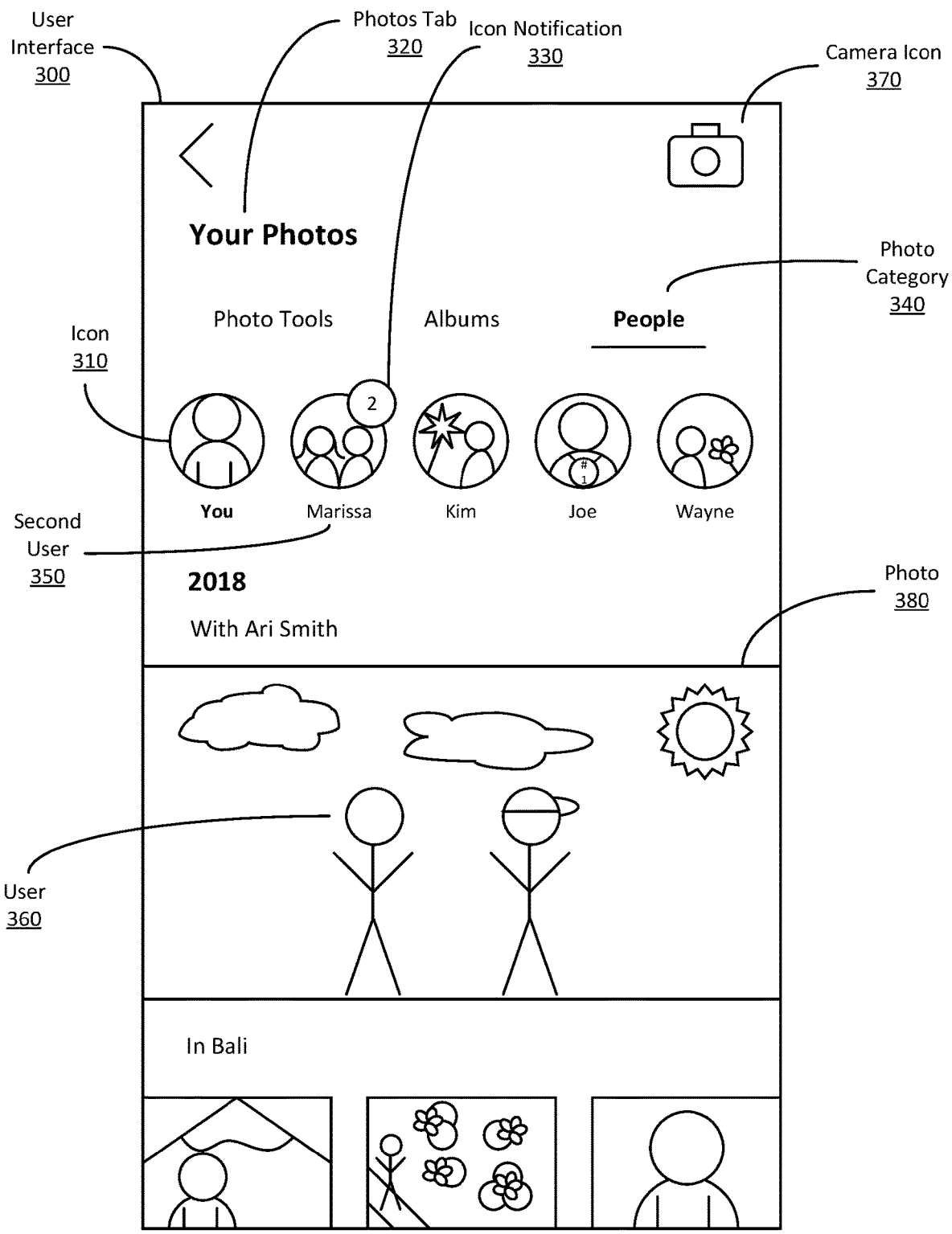
FIG. 3 is an example user interface depicting a user's photos tab, according to one embodiment.
Figure 4:
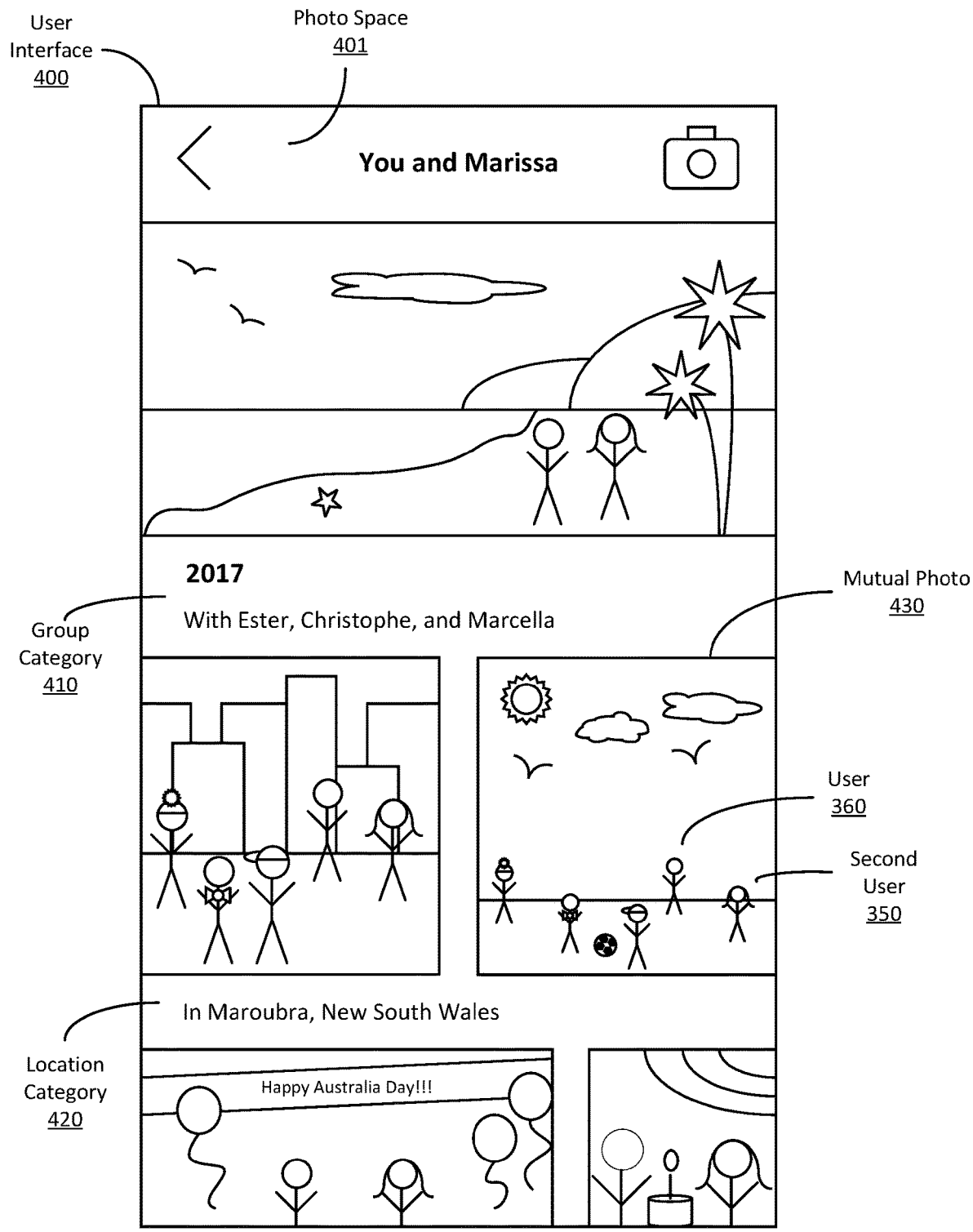
FIG. 4 is an example user interface depicting a user's photo space depicting media items with the user and a second user, according to one embodiment.
Figure 5:
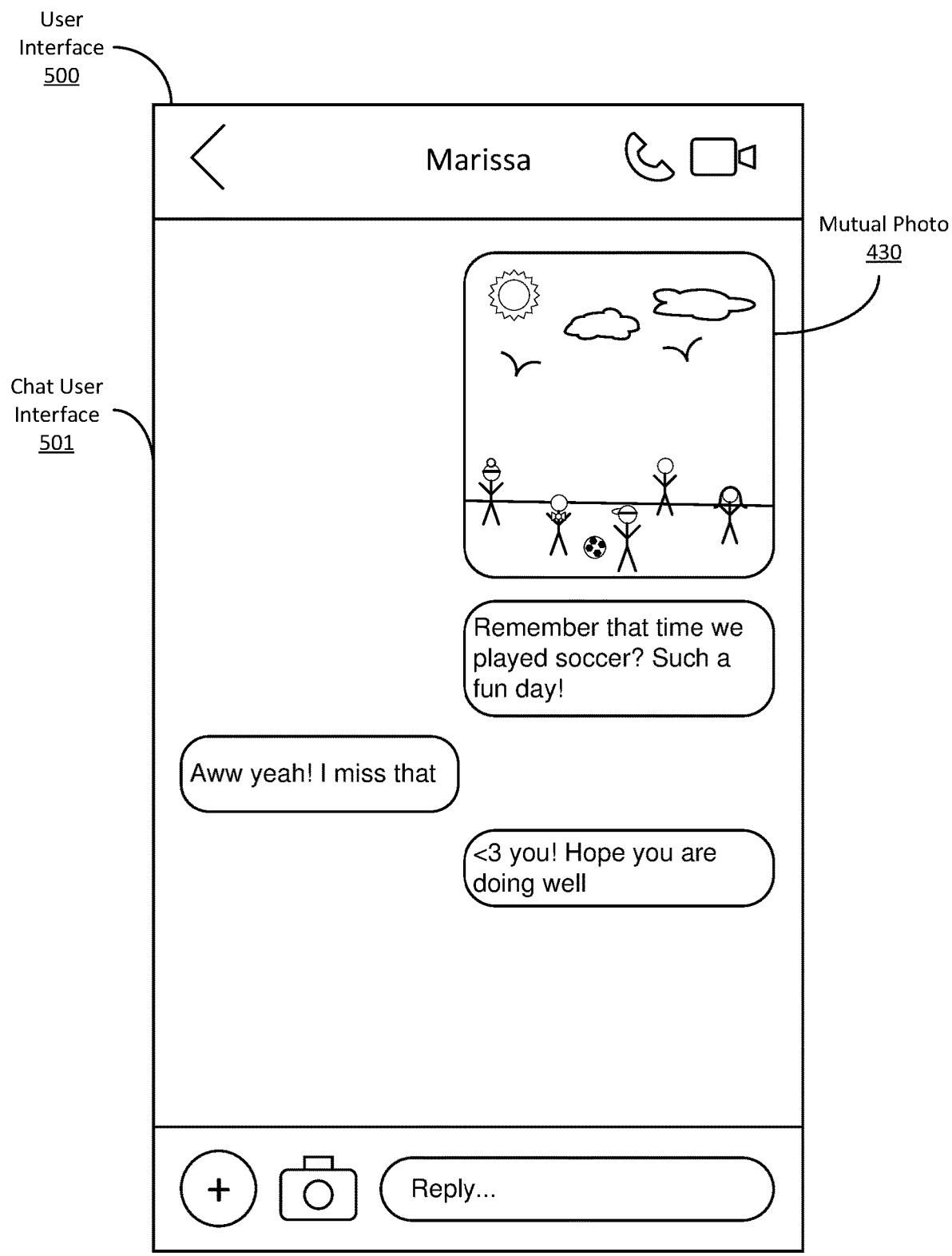
FIG. 5 is an example of a chat user interface depicting a chat between the user and a second user about a photo depicting the user and the second user, according to one embodiment.

The user interface generation module 230 generates a user interface that is displayed to users on the client devices 110. Users 210 see and interact with content in the user interface, such as photos. The user interface generation module 230 generates the user interface such that it displays photos grouped by users identified in or associated with the photos. Example user interfaces generated by the user interface generation module 230 are illustrated in FIGS. 3-5, described later below.

The chat generation module 240 generates chat user interfaces for private chats between users 210 within the context of the photos in which the users are present. The private chats are only available between the users present in the photo used to generate the chat. First, the social networking system 100 receives a notification that a user has interacted with a photo indicating that the user wishes to start a chat with other users tagged in the photo. The chat generation module 240 accordingly generates a chat user interface between the users in relation to the photo and causes display of the chat on the client devices 110 in the chat user interface that allows users 210 to converse with one another. The chat user interface for the particular private chat is only made available to the participants in the private chat. In one embodiment, the photo is included in the chat user interface along with a message from the user who initiated the chat; including the photo as part of the chat places the chat within the context of the photo.

The facial recognition module 250 uses facial recognition technology to determine the presence of users 210 in photos. The facial recognition module 250 analyzes photos stored in the object store 200 and creates implicit tags for the photos that identify the users 210 present in the photos. The implicit tags are stored as a part of tags 214 in the object store 200, along with explicit tags. For example, assume that Ringo, Juno, and Hans are present in a photo posted in the social networking system 100. Another user, Raleigh, might look at the photo via a user interface on his client device 110 and tag Ringo and Hans as being present within the photo, and the tags would be stored as explicit tags in the object store 200. Additionally, the facial recognition module 250 within the social networking system 100 could apply facial recognition technology to the photo, identifying that Juno is also present in the photo by matching an image of Juno's face in the photo with other images of the social networking system known to represent Juno's face, and stores this information as an implicit tag in the object store 200.

Example User Interfaces

FIG. 3 shows an example user interface 300 displaying a photos tab 320 to a user 360. The "People" photos tab 320 shows photos the user 360 posted or was tagged in. In this example, the user 360 is pictured in one of the photos 380 in the user interface 300. The photos in the photos tab 320 may be organized in various ways. In the example of FIG. 3, the photos are grouped by other users present in the photo along with the user 360 (i.e. the user 360 is "With Ari Smith" in photo 380) and by location (i.e. "In Bali"). Other embodiments may organize photos in a timeline by date (e.g., particular months, years, or chronological events), by groups of users tagged in photos (e.g., 3 particular users who tend to occur together in photos), by event associated with the photos (e.g., "Christmas"), and/or by geographic locations (e.g., "Bali"), or combinations thereof.

Additionally, the photos tab 320 displays icons 310 that represent other users of the social networking system 100. The other users are connected to the user 360 on the social networking system 100, either as first-degree connections (e.g., directly as friends) or as second-degree connections (e.g., indirectly as friends of friends). In another embodiment, the other users are anyone tagged in the photos, whether or not they are directly connected with the user 360. The user 360 can interact with an icon 310 representing a second user 350 to view a user interface that displays a photo space of photos in which both the user and the second user are tagged (explicitly or implicitly). Icons 310 may represent a single user, and on some embodiments may also represent a group of users. Icons 310 may have an icon notification 330 that indicates that new photos are available in the photo space. New photos are photos that have recently been uploaded to the social networking system 100 and have not been seen by the user 360 via the social networking system 100. In the example user interface of FIG. 3, the user 360 and a second user 350, named Marissa, along with other users Kim, Joe, and Wayne, are represented by icons 310 in the photos tab 320. These icons 310 may be displayed in a random order or may be ordered by the frequency of interaction the user 360 has with the other users over the social networking system 100 (e.g., posting messages to the other users, reading or indicating affinity for the posts of other users, or the like). For example, if the icons were ordered by frequency of interaction, the icon ordering of FIG. 3 indicates that user 360 interacts the most with the second user 350 (Marissa), and least with Wayne. The icons may be ordered in alternate ways in other embodiments. The other users may be represented in other embodiments by means other than the icons 310, such as by tabs.

FIG. 4 shows an example user interface 400 displaying a photo space 401 of the user 360 and a second user 350. This user interface 400 might be displayed, for example, in response to the user 360 selecting the user icon 350 in FIG. 3. The photo space 401 contains photos in which both the user 360 and the second user 350 are tagged, such as the mutual photo 430. In other embodiments, more users may be displayed and the photo space may be organized in other ways. In the example in FIG. 4, the photos are grouped into a group category 410 and a location category 420. The group category 410 contains photos of the user 360 and the second user 350 with other users (Ester, Christophe, and Marcella). Groupings may be found using a co-occurrence analysis that determines which users are frequently present together in photos. The location category 420 contains photos of the user 360 and the second user 350 in a particular location (Maroubra, New South Wales in the example of FIG. 4). These categories may be used for other users, other groups of users, and other locations. Other categories not shown may also be used in the photo space 320 in alternate embodiments.

The photo space 401 may also be a visual collection of videos and other media items other than photos. The media items displayed in the photo space 401 may include only one type of media item, such as videos, or may contain a mixture of types of media items, depending on the embodiment.

FIG. 5 illustrates an example chat between the user 360 and the second user 350 via a chat user interface 501 within the context of one of the photos of FIG. 4. In order to start the chat with the second user 350, the user 360 interacts with one of the photos in the photo space 401 (the mutual photo 430, in the current example). Interactions may include tapping or clicking on the photo. In an embodiment, the user may choose multiple photos to interact with to generate the chat user interface. Once the chat user interface 501 is generated, the user 360 and the second user 350 may have a conversation via the chat user interface 501, as depicted in FIG. 5. In an embodiment, the mutual photo 430 is included within the chat user interface 501 along with a message from the user 360 to the second user 350 to start the conversation, thereby placing the chat in the context of the photo 430. In other embodiments, the chat may include more users in the chat. For example, if all of the users in the social networking system 100 were present in the same photo, a chat could be started with all of the users in the photo. In some embodiments, users in a generated chat may add other users to the chat who were not present in the photo used to generate the chat. The users in the chat may contribute other photos or text input to facilitate the conversation. The chat user interface may be displayed in other ways than that shown in FIG. 5, such as on a section of the user interface with the photo space 401 of FIG. 4.

Method for Generating a Chat Based on an Interaction with a Photo

Figure 6:
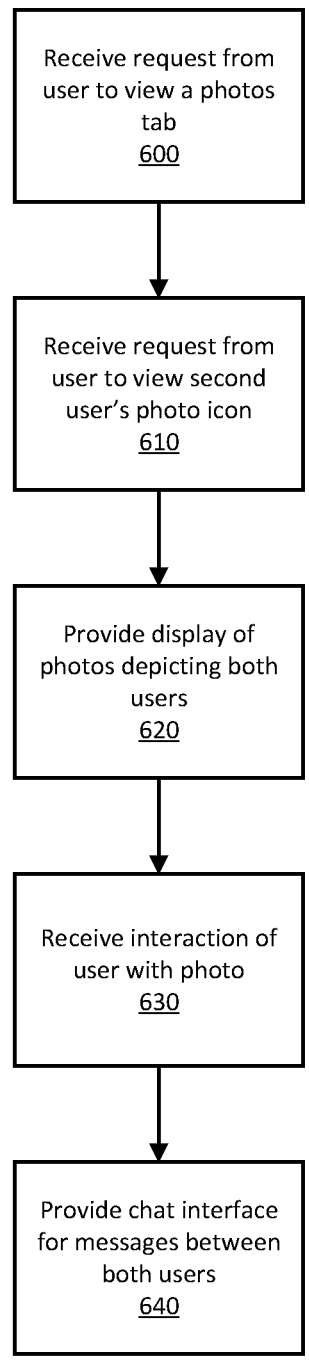
FIG. 6 is a flowchart illustrating operations performed by the social networking system to generate a photo space and a chat, according to one embodiment.

FIG. 6 illustrates the process by which the social networking system 100 generates a photo space and a chat between users, according to one embodiment. The process begins when the social networking system 100 receives 600 a request from a user to view a photos tab via the user interface 300. The request may come from an interaction made by the user with a button or tab on the user interface (such as that illustrated in FIG. 3), in one embodiment. In some embodiments, the photos tab may be accessed under the user's profile in the social networking system 100.

The social networking system 100 then receives 610 a request by the user to view a second user's photo icon, which triggers the social networking system 100 to provide 620 a display, via the user interface, a photo space of photos in which both users are present, e.g., as illustrated in FIG. 4. The request may come from an interaction with the second user's photo icon via the user interface, in one embodiment, such as clicking on or tapping the icon, depending on the client device type.

The social networking system 100 next receives 630 an interaction by the user with a photo within the photo space, indicating that the user would like to start a chat with the second user. The interaction may be clicking on or tapping the photo, depending on the client device type. In response, the social networking system 100 provides 640 a chat interface for messages between the users, which the users can then use to communicate, e.g., as illustrated in FIG. 5. The users use the provided chat interface to chat with reference to the photo. For example, the chat interface may include the photo, such as a picture inserted into the post, thereby providing a natural context for private discussion of the photo.

It is appreciated that although FIG. 6 illustrates a number of interactions according to one embodiment, the precise interactions and/or order of interactions may vary in different embodiments. For example, the system may receive multiple interactions by a user with photos in one photo space and provide the chat interface multiple times before the user begins interacting with photos in a different photo space.

Figure 7:
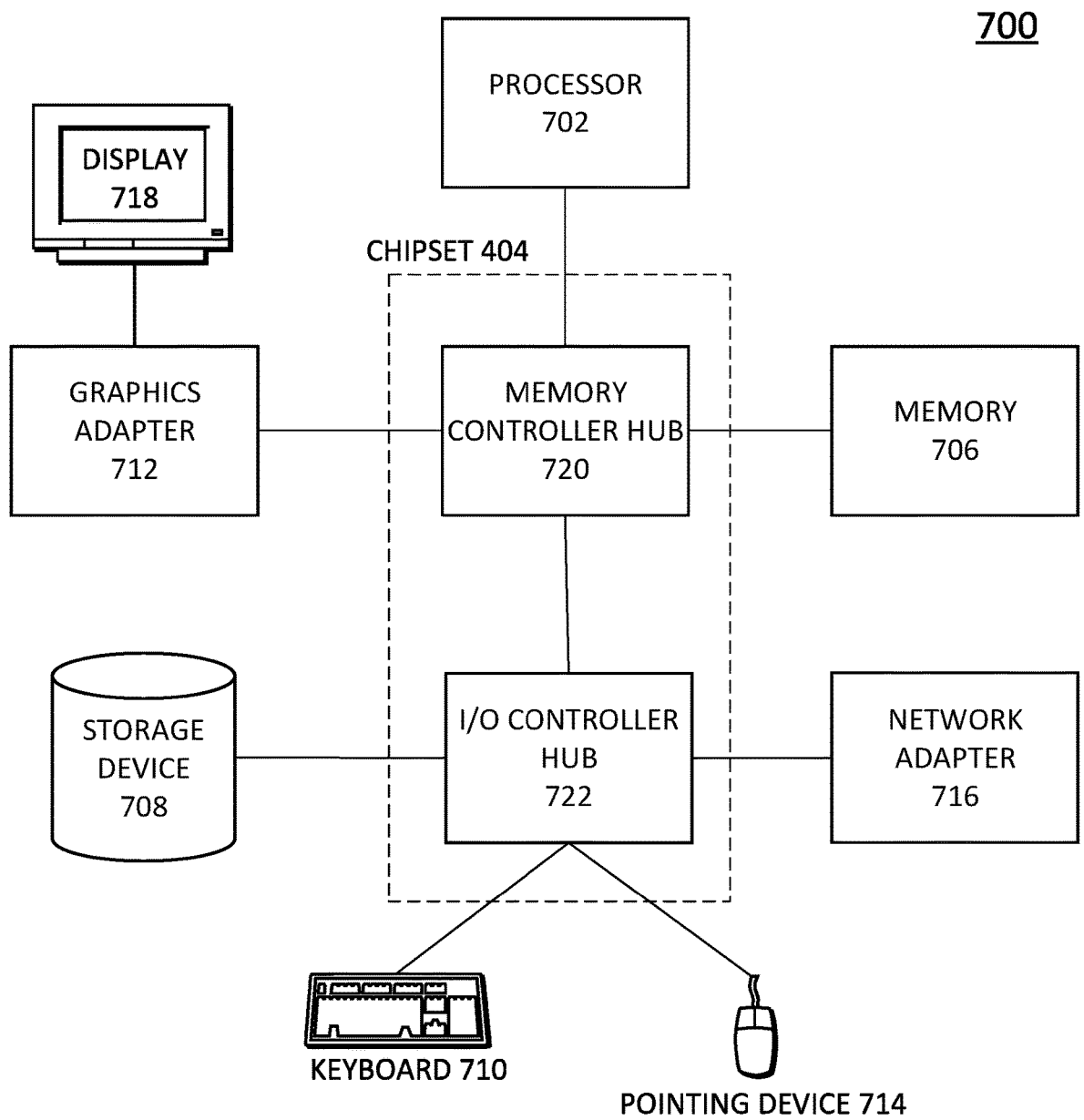
FIG. 7 is a high-level block diagram illustrating physical components of a computer used as part or all of the client device from FIG. 1, according to one embodiment.

FIG. 7 is a high-level block diagram illustrating physical components of a computer 700 used as part or all of the social networking system 100 and/or client devices 110 from FIG. 1, according to one embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server, or a smartphone, may lack a graphics adapter 712, and/or display 718, as well as a keyboard or pointing device. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for a providing a photo space to users of a social networking system, the method comprising:
   receiving, by the social networking system, a request by a first user to access a photos tab within the social networking system;
   providing for display to the first user a plurality of icons that the first user can access to view photo categories under the icons, at least one of the icons including an icon representing a second user;
   receiving an interaction representing a request by the first user to access the icon representing the second user;
   responsive to receiving the interaction representing the request to access the icon representing the second user, providing for display to the first user a photo space comprising a plurality of photos, each photo including at least the first user and the second user in the photo and having been identified by the social networking system as being associated with the icon representing the second user based on one or more of the following:
   the photo having tags that indicate that both the first user and the second user are present in the photo, and the photo having been determined based on facial recognition performed by the social networking system to include both the first user and the second user;

receiving an interaction by the first user with a first one of the photos to initiate a private chat with the second user in the photo; and responsive to receiving the interaction with the first one of the photos, providing a chat interface in which the first user and the second user can privately chat with each other with reference to the first one of the photos.

2. The computer-implemented method of claim 1, wherein the social networking system groups the plurality of photos in the photo space in a timeline ordered by date of the photos.

3. The computer-implemented method of claim 1, wherein the social networking system groups the plurality of photos in the photo space by geographic location of the photos.

4. The computer-implemented method of claim 1, wherein the social networking system groups the plurality of photos in the photo space by event associated with the photos.

5. The computer-implemented method of claim 1, wherein the social networking system groups the plurality of photos in the photo space by other users also tagged or recognized by facial recognition in any of the plurality of photos.

6. The computer-implemented method of claim 1, further comprising:
identifying a plurality of videos in which the second user is tagged or recognized via facial recognition; and
displaying the plurality of videos in visual association with the plurality of photos in the photo space.

7. The computer-implemented method of claim 1, further comprising:
determining frequencies of interaction between the user and users represented by the icons, including the second user;
ordering the icons for display by the frequencies of interaction.

8. A non-transitory computer-readable storage medium comprising instructions executable by a processor, the instructions comprising:
instructions for receiving, by the social networking system, a request by a first user to access a photos tab within the social networking system;
instructions for providing for display to the first user a plurality of icons that the first user can access to view photo categories under the icons, at least one of the icons including an icon representing a second user;
instructions for receiving an interaction representing a request by the first user to access the icon of representing the second user;
instructions for, responsive to receiving the interaction representing the request, providing for display to the first user a photo space comprising a plurality of photos, each photo including at least the first user and the second user in the photo and having been identified by the social networking system as being associated with the icon representing the second user based on one or more of the following:
the photo having tags that indicate that both the first user and the second user are present in the photo, and
the photo having been determined based on facial recognition performed by the social networking system to include both the first user and the second user;
instructions for receiving an interaction by the first user with a first one of the photos to initiate a private chat with the second user in the photo; and
instructions for, responsive to receiving the interaction with the first one of the photos, providing a chat interface in which the first user and the second user can privately chat with each other based on the first one of the photos.

9. The non-transitory computer-readable storage medium of claim 8, wherein the social networking system groups the plurality of photos in the photo space in a timeline ordered by date of the photos.

10. The non-transitory computer-readable storage medium of claim 8, wherein the social networking system groups the plurality of photos in the photo space by geographic location of the photos.

11. The non-transitory computer-readable storage medium of claim 8, wherein the social networking system groups the plurality of photos in the photo space by event associated with the photos.

12. The non-transitory computer-readable storage medium of claim 8, wherein the social networking system groups the plurality of photos in the photo space by other users also tagged or recognized by facial recognition in any of the plurality of photos.

13. The non-transitory computer-readable storage medium of claim 8, the instructions further comprising:
identifying a plurality of videos in which the second user is tagged or recognized via facial recognition; and
displaying the plurality of videos in visual association with the plurality of photos in the photo space.

14. The non-transitory computer-readable storage medium of claim 8, the instructions further comprising:
determining the frequency of interaction between the user and users represented by the icons, including the second user;
ordering the icons for display by frequency of interaction.

15. A computer system comprising:
a computer processor; and
a non-transitory computer-readable storage medium storage instructions that when executed by the computer processor perform actions comprising:
receiving, by the social networking system, a request by a first user to access a photos tab within the social networking system;
providing for display to the first user a plurality of icons that the first user can access to view photo categories under the icons, at least one of the icons including an icon representing a second user;
receiving an interaction representing a request by the first user to access the icon of representing the second user;
responsive to receiving the interaction representing the request, providing for display to the first user a photo space comprising a plurality of photos, each photo including at least the first user and the second user in the photo and having been identified by the social networking system as being associated with the icon representing the second user based on one or more of the following:
the photo having tags that indicate that both the first user and the second user are present in the photo, and
the photo having been determined based on facial recognition performed by the social networking system to include both the first user and the second user;

receiving an interaction by the first user with a first one of the photos to initiate a private chat with the second user in the photo; and responsive to receiving the interaction with the first one of the photos, providing a chat interface in which the first user and the second user can privately chat with each other based on the first one of the photos.

16. The computer system of claim 15, wherein the social networking system groups the plurality of photos in the photo space in a timeline ordered by date of the photos.

17. The computer system of claim 15, wherein the social networking system groups the plurality of photos in the photo space by geographic location of the photos.

18. The computer system of claim 15, wherein the social networking system groups the plurality of photos in the photo space by event associated with the photos.

19. The computer system of claim 15, wherein the social networking system groups the plurality of photos in the photo space by other users also tagged or recognized by facial recognition in any of the plurality of photos.

20. The computer system of claim 15, the actions further comprising:

determining the frequency of interaction between the user and the users represented by the icons, including the second user;

ordering the icons for display by frequency of interaction.

* * * * *